United States Patent Office 2,819,945
Patented Jan. 14, 1958

2,819,945

METHOD OF SEPARATING VALUES OF COLUMBIUM AND/OR TANTALUM FROM A CONCENTRATE ALSO CONTAINING AN ELEMENT OF GROUP IV B

John R. Ruhoff and George L. Martin, Webster Groves, and Charles O. Gerfen, Brentwood, Mo., assignors to Mallinckrodt Chemical Works, St. Louis, Mo., a corporation of Missouri No Drawing. Application February 15, 1955,
Serial No. 488,401

5 Claims. (Cl. 23—18)

This invention relates to a separation process and more particularly to a process for separating columbium and/or tantalum values from mineral concentrates.

Briefly, the present invention is directed to the method of upgrading a columbium and/or tantalum-containing concentrate by separating at least one of these values from a concentrate solution in which the columbium and/or the tantalum and an element of group IV B of the periodic table are present as their fluocomplexes, which comprises adding a base selected from the group consisting of ammonium hydroxide, sodium hydroxide and potassium hydroxide to said solution to separate at least one of these values from the group IV B component of the solution.

Among the several objects of this invention are the provision of methods for the separation of columbium and tantalum values from ore concentrates containing compounds of these elements associated with a compound of an element of group IV B of the periodic table, such as titanium; the provision of methods which yield a concentrate of columbium and tantalum values in reactive and readily usable form; the provision of methods for separating columbium and tantalum values which employ only inexpensive and readily available reagents; and the provision of methods for separating columbium and tantalum values from titanium compounds which do not require prior reduction of titanium to a valence state lower than that in which it normally is found in ores. Other objects and features will be in part apparent and in part pointed out hereinafter.

The invention accordingly comprises the methods hereinafter described, the scope of the invention being indicated in the following claims.

Some ores containing columbium and tantalum values also contain titanium compounds and may contain other compounds of elements from group IV B of the periodic table. However, the chemical methods heretofore available for separating the columbium and tantalum values from concentrates containing compounds of elements of group IV B of the periodic table have been inefficient, or required the use of expensive chemical reagents or required prior reduction of the titanium to a lower valence state in order to increase its solubility.

In accordance with the present invention, it has been found that columbium and tantalum values can be conveniently and economically separated from such concentrates by precipitation of columbium and tantalum values with a base, such as ammonia, from a solution of the fluocomplexes of these elements. Althrough the exact mechanism of the reactions involved in this method of separating the columbium and tantalum values is not fully known, it may be represented by the following equations, which are given for illustrative purposes only, and are not to be interpreted in any limiting sense:

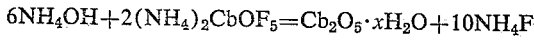
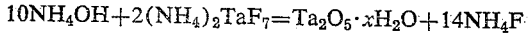

$6NH_4OH + 2(NH_4)_2CbOF_5 = Cb_2O_5 \cdot xH_2O + 10NH_4F$ $10NH_4OH + 2(NH_4)_2TaF_7 = Ta_2O_5 \cdot xH_2O + 14NH_4F$ The group IV B element or elements are present in the solution in the form of their simple fluocomplexes before the hydrous oxides of columbium and tantalum are precipitated. The fluocomplexes are in the form of $M_2AF_6$ (where M is ammonium, sodium or potassium and A is a group IV B metal), but as the precipitation is carried out some is converted to the somewhat less soluble $M_2AOF_4$ when the group IV B metal is titanium.

If the amount of ammonia added to the concentrate solution is substantially equal to that required to decompose the columbium and tantalum fluocomplexes according to the above reactions (including neutralization of any free acid or other ammonia-consuming impurities, such as iron, which may have been present initially), columbium and tantalum values are precipitated as the hydrous oxides of columbium and tantalum, while titanium compounds and other compounds of group IV B elements remain in solution as their fluocomplexes. It is preferred that the amount of ammonia added to the concentrate solution be not in excess of that required to decompose the columbium and the tantalum fluocomplexes. Thus, where it is desired to avoid the precipitation of even a small amount of titanium oxide, somewhat less than the amount of ammonia required to decompose all of the columbium and tantalum fluocomplexes should be added; whereas if it is desired to remove all of the columbium and tantalum values, somewhat more than this amount of ammonia is added. The hydrous oxides are reactive and can either be dried or readily converted to any other desired compounds of these elements by methods known to those skilled in the art.

Although the use of ammonia as a precipitating base is usually preferred, either sodium or potassium hydroxide can be used. The ammonium salts of the complexes are somewhat more soluble than the sodium or potassium salts, thus permitting a higher initial concentration of salts in the solution. The temperature at which the instant process is carried out is not critical, but it is generally preferred that elevated temperatures be employed. It is usually preferable to heat the solution to minimize the crystallization of the titanium-containing compounds or complexes, the solubility of which is somewhat limited at room temperature and is depressed by byproducts formed by the reaction. When the solution is heated, additional ammonia should be added to compensate for any volatilization which may occur.

A practical separation of columbium and tantalum values from titanium compounds and compounds of other group IV B elements is usually obtained in a single precipitation. If the initial concentration of titanium compounds is very high, or if the recovered columbium-tantalum values must contain as little of the group IV B elements as possible, it may be desirable to reconstitute the hydrous oxides as their complex fluorides and reprecipitate them with ammonia. Likewise, only part of the columbium and tantalum values may be precipitated initially and separated by any convenient means, such as filtration. The remainder of the columbium and tantalum values can then be precipitated along with a part of the titanium oxide, separated, converted to a solution of the complex fluorides, and returned to the process.

The following examples illustrate the invention.

*Example 1*

An aqueous solution (7.7 liters) of the fluocomplexes of columbium, tantalum and titanium contained 54 g./liter of fluoride (expressed as $NH_4HF_2$), 50 g./liter of columbium and tantalum (expressed as $(Cb,Ta)_2O_5$), and 4.9 g./liter of titanium (expressed as $TiO_2$). Ammonia (10% solution) was added to this solution at a temperature of 27° C. until a precipitate was just visible (500 ml. required) and then an additional quantity (1500 ml.) was added with vigorous stirring to precipitate the hydrous oxides of columbium and tantalum (the calculated stoichiometric quantity was 1480 ml.). The precipitate was filtered off and washed with water (2.0 liters). The columbium-tantalum content of the precipitate (expressed as $(Cb,Ta)_2O_5$) was 372 g., which represented a 96.5% yield. The ratio of columbium-tantalum oxide to titanium oxide (($(Cb,Ta)_2O_5/TiO_2$) in the precipitate was 55 to 1, compared to the initial ratio in the soluton of 11 to 1.

*Example 2*

An aqueous solution (3.8 liters) of the fluocomplexes of columbium, tantalum and titanium contained 36 g./liter of fluoride (expressed as $NH_4HF_2$), 21.3 g./liter of columbium and tantalum (expressed as $(Cb,Ta)_2O_5$), and 2.5 g./liter of titanium (expressed as $TiO_2$). Ammonia (10% solution) was added to this solution at a temperature of 34° C. until a precipitate was just visible (100 ml. required), and then an additional quantity (300 ml.) was added with vigorous stirring to precipitate the hydrous oxides of columbium and tantalum (the calculated stoichiometric quantity was 309 ml.). The precipitate was filtered off and washed with water (1.0 liter). The columbium-tantalum content of the precipitate (expressed as $(Cb,Ta)_2O_5$) was 67 g., which represented an 83% yield. The ratio of columbium-tantalum oxide to titanium dioxide in the precipitate was 44 to 1, compared to the initial ratio in the solution of 8.5 to 1.

*Example 3*

An aqueous solution (13.0 liters) of the fluocomplexes of columbium, tantalum and titanium containing 50.3 g./liter of fluoride (expressed as $NH_4HF_2$), 13.1 g./liter of columbium and tantalum (expressed as $(Cb,Ta)_2O_5$), and 14.3 g./liter of titanium (expressed as $TiO_2$) was heated to 90° C. Ammonia (10% solution) was added until a precipitate was just visible (2.0 liters required), and then an additional quantity (1.0 liter) was added with vigorous stirring to precipitate the hydrous oxides of columbium and tantalum (the calculated stoichiometric quantity was 650 ml.). The excess was provided to compensate for losses of ammonia due to volatilization. The hot mixture (approximately 80° C.) was filtered and the precipitate was washed with hot water (2.0 liters). The columbium-tantalum content of the precipitate (expressed as $(Cb,Ta)_2O_5$) was 140 g., which represented an 82% yield. The ratio of columbium-tantalum oxide to titanium dioxide in the precipitate was 14 to 1, compared to the initial ratio in the solution of 0.9 to 1.

*Example 4*

An aqueous solution (5.7 liters) of the fluocomplexes of columbium, tantalum and titanium containing 90.0 g./liter of fluoride (expressed as $NH_4HF_2$), 13.8 g./liter of columbium and tantalum (expressed as $(Cb,Ta)_2O_5$), and 14.4 g./liter of titanium (expressed as $TiO_2$) was heated to 90° C. Ammonia (10% solution) was added until a precipitate was just visible (700 ml. required), and then an additional quantity (400 ml.) was added with vigorous stirring to precipitate the hydrous oxides of columbium and tantalum (the calculated stoichiometric quantity was 300 ml.). The excess was provided to compensate for losses of ammonia due to volatilization. The hot mixture (approximately 80° C.) was filtered and the precipitate was washed with hot water (1.1 liters). The columbium-tantalum content of the precipitate (expressed as $(Cb,Ta)_2O_5$) was 68 g., which represented an 87% yield. The ratio of columbium-tantalum oxide to titanium dioxide in the precipitate was 18 to 1, compared to the initial ratio in the solution of 0.95 to 1.

*Example 5*

An aqueous solution (6.0 liters) of the fluocomplexes of columbium, tantalum and titanium containing 81 g./liter of fluoride (expressed as $NH_4HF_2$), 15.3 g./liter of columbium and tantalum (expressed as $(Cb,Ta)_2O_5$). and 16.3 g./liter of titanium (expressed at $TiO_2$) was heated to 90° C. Ammonia (10% solution) was added until a precipitate was just visible (500 ml. required) and then an additional quantity (500 ml.) was added with vigorous stirring to precipitate the hydrous oxides of columbium and tantalum (the calculated stoichiometric quantity was 350 ml.). The excess was provided to compensate for losses of ammonia due to volatilization. The hot mixture (approximately 80° C.) was filtered and the precipitate was washed with hot water (1.0 liter). The columbium-tantalum content of the precipitate (expressed as $(Cb,Ta)_2O_5$) was 73 g., which represented an 80% yield. The ratio of columbium-tantalum oxide to titanium dioxide in the precipitate was 22 to 1, compared to the initial ratio in the solution of 0.9 to 1.

*Example 6*

To an aqueous solution (100 ml.) of the fluocomplexes of columbium and titanium containing 35 g./liter of fluoride (expressed as HF), 34.5 g./liter of columbium (expressed as $Cb_2O_5$), and 25.5 g./liter of titanium (expressed as $TiO_2$) was added ammonium hydroxide (15 ml. of a 28% solution). The resulting mixture was heated to 60° C. and stirred for one hour. The mixture was thereafter filtered. The residue contained 72% of the columbium originally present. The ratio of columbium oxide to titanium oxide in the precipitate was 49 to 1, compared to the initial ratio in the solution of 1.35 to 1.

It is to be understood that, while the process of the present invention is primarily useful for the separation of columbium and tantalum values from concentrate solutions containing compounds and complexes of titanium, it is also useful for the separation of columbium and tantalum values from compounds and complexes of the other group IV B elements, zirconium and hafnium, whether or not titanium compounds are also present. Furthermore, as set forth above, the present process is also useful for individually separating either columbium values or tantalum values from concentrate solutions which contain either columbium or tantalum values, but not both, and compounds of a group IV B element. Also it is to be noted that, although fluocomplexes of other metallic elements may be present in the solution, this does not interfere with the separation of columbium and tantalum values from the compounds of group IV B elements. The removal of such other elements can be effected by other well known methods if desired.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

We claim:

1. The method of separating values of at least one element selected from the group consisting of columbium and tantalum from a concentrate solution in which at least one of these values and an element of group IV B of the periodic table are present as their fluocomplexes, comprising adding a base selected from the group consisting of ammonium hydroxide, sodium hydroxide and potassium hydroxide to said solution to precipitate the hydrous oxide of at least one element selected from the group consisting of columbium and tantalum from the solution containing of said group IV B element.

2. The method of separating columbium and tantalum values from a concentrate also containing a compound of an element of group IV B of the periodic table, comprising adding a base selected from the group consisting of ammonium hydroxide, sodium hydroxide and potassium hydroxide to a solution of said concentrate containing the fluocomplexes of columbium, tantalum and said group IV B element to precipitate hydrous oxides of columbium and tantalum.

3. The method of separating columbium and tantalum values from a concentrate solution in which the columbium and the tantalum and titanium are present as their fluocomplexes, comprising adding ammonium hydroxide to said solution, to precipitate hydrous oxides of columbium and tantalum from the titanium component of the solution.

4. The method of separating columbium and tantalum values from a concentrate also containing a titanium compound, comprising adding ammonium hydroxide to a solution of said concentrate containing the fluocomplexes of columbium, tantalum and titanium to precipitate hydrous oxides of columbium and tantalum, the amount of ammonium hydroxide added being not substantially in excess of that required to decompose the columbium and tantalum fluocomplexes.

5. The method of separating columbium and tantalum values from a concentrate containing a titanium compound, comprising heating a solution of said concentrate containing the fluocomplexes of columbium, tantalum and titanium, and thereafter adding ammonium hydroxide to said solution to precipitate hydrous oxides of columbium and tantalum, the amount of ammonium hydroxide added being not substantially in excess of that required to decompose the columbium and tantalum fluocomplexes.

References Cited in the file of this patent

UNITED STATES PATENTS

| | | |
|---|---|---|
| 1,618,960 | Coster | Feb. 22, 1927 |
| 1,802,242 | Fink et al. | Apr. 21, 1931 |
| 2,259,396 | Schlecht et al. | Oct. 14, 1941 |
| 2,481,584 | Fowler | Sept. 13, 1949 |

FOREIGN PATENTS

| | | |
|---|---|---|
| 220,359 | Great Britain | Aug. 11, 1934 |

OTHER REFERENCES

Chem. Abs. 49, 1461 (Feb. 10, 1955).